(12) United States Patent
Chinthalapudi et al.

(10) Patent No.: US 10,485,050 B2
(45) Date of Patent: Nov. 19, 2019

(54) METHODS AND USER EQUIPMENT FOR MANAGING INTERNET PROTOCOL MULTIMEDIA SUBSYSTEM CALL OVER LONG-TERM EVOLUTION IN SINGLE RADIO VOICE CALL CONTINUITY AREA

(71) Applicant: Samsung Electronics Co., Ltd., Suwon-si, Gyeonggi-do (KR)

(72) Inventors: Srinivas Chinthalapudi, Bangalore (IN); Prasad Basavaraj Dandra, Bangalore (IN); Manan Dixit, Bangalore (IN); Kedar Santosh Kumar Aalla, Bangalore (IN)

(73) Assignee: Samsung Electronics Co., Ltd., Gyeonggi-do (KR)

( * ) Notice: Subject to any disclaimer, the term of this patent is extended or adjusted under 35 U.S.C. 154(b) by 85 days.

(21) Appl. No.: 15/466,096

(22) Filed: Mar. 22, 2017

(65) Prior Publication Data
US 2018/0070402 A1 Mar. 8, 2018

(30) Foreign Application Priority Data
Sep. 7, 2016 (IN) .............................. 201641030564

(51) Int. Cl.
| | |
|---|---|
| *H04W 76/25* | (2018.01) |
| *H04L 29/06* | (2006.01) |
| *H04W 76/38* | (2018.01) |
| *H04W 76/27* | (2018.01) |

(52) U.S. Cl.
CPC ......... *H04W 76/25* (2018.02); *H04L 65/1016* (2013.01); *H04L 65/1073* (2013.01); *H04L 65/1083* (2013.01); *H04L 65/80* (2013.01); *H04W 76/27* (2018.02); *H04W 76/38* (2018.02)

(58) Field of Classification Search
CPC ..... H04W 76/25; H04W 76/38; H04W 76/27; H04W 24/04; H04L 65/1016; H04L 65/1073; H04L 65/1083; H04L 65/80
See application file for complete search history.

(56) References Cited

U.S. PATENT DOCUMENTS

| | | |
|---|---|---|
| 2015/0201454 A1 | 7/2015 | Shukair et al. |
| 2016/0156544 A1 * | 6/2016 | Holm ...................... H04L 45/02 370/389 |

* cited by examiner

*Primary Examiner* — Eric Myers
(74) *Attorney, Agent, or Firm* — Harness, Dickey & Pierce, P.L.C.

(57) ABSTRACT

Methods and User Equipment (UE) for managing IMS call over LTE in SRVCC area are provided. The method may include detecting, by an IMS client, that the IMS call over LTE is in an alert state, and a Radio Resource Control (RRC) reconfiguration cells are configured for the IMS call over LTE. Further, the method may include initiating by the IMS client a timer with a value less than a data inactivity timer value from a network entity. Further, the method may include detecting by IMS client that the timer has expired before establishing the IMS call over LTE and restarting by the IMS client the timer. Furthermore, the method may include sending by the IMS client a Session Initiation Protocol (SIP) message to the network entity.

20 Claims, 12 Drawing Sheets

METHODS AND USER EQUIPMENT FOR MANAGING INTERNET PROTOCOL MULTIMEDIA SUBSYSTEM CALL OVER LONG-TERM EVOLUTION IN SINGLE RADIO VOICE CALL CONTINUITY AREA

CROSS-REFERENCE TO RELATED APPLICATIONS

This application claims priority under 35 U.S.C. § 119(a) to Indian Complete Patent Application Serial No. 201641030564, which was filed on Sep. 7, 2016 in the Indian Intellectual Property Office, the entire disclosure of this application is incorporated herein by reference.

FIELD OF INVENTION

The present inventive concepts relate to wireless communications, and more particularly, to methods and/or User Equipment (UE) for managing an Internet Protocol multimedia subsystem (IMS) call over Long-Term Evolution (LTE) in a Single Radio Voice Call Continuity (SRVCC) area.

BACKGROUND

In accordance with a LTE radio access network (RAN) and with reference to FIG. 1, Third Generation Partnership Project (3GPP) has standardized a SRVCC to provide seamless service continuity when a UE 102 performs a handover from an Evolved Universal Terrestrial Radio Access (E-UTRAN) to UTRAN/GSM EDGE Radio Access Network (GERAN). In the SRVCC, calls are anchored in an IMS network while the UE is capable of transmitting/receiving information, signal, or data on only one of those access networks at a given time. Thus, the call anchored in the IMS core can be continued in a UMTS/Global System for Mobile Communications (GSM) networks and/or outside of the LTE coverage area.

Due to a Circuit Switched Fall Back (CSFB) limitation of drop in data rates when the UE falls back to a 2G/3G network during a voice call, SRVCC handover is desired. The SRVCC is desired where LTE is distributed over some area, an operator wants to use IMS based Voice over LTE (VoLTE) calls in LTE, and this call is handed over to the existing 2G/3G network as a normal Circuit Switched (CS) call when device is moving out of the LTE coverage, as illustrated in FIG. 1.

In such scenarios, some problems through IMS Call establishment in progress and Early Media may occur. For example, if the UE 102 moves to the 3G network coverage, a call drop may be encountered. This call drop could be due to inactivity of data and/or Radio Resource Control (RRC) connection release. When the RRC connection is released, a Measurement Report (MR) may not be sent and SRVCC may not be performed.

Thus, methods and/or equipment by which the synchronization between the UE 102 and the network entity can be effectively maintained while mitigating or preventing any call drop event occurrences are being desired.

SUMMARY

The example embodiments disclosed herein are to provide methods and/or UE for managing an IMS call over LTE in a SRVCC area.

The example embodiments disclosed herein are to provide mechanisms for detecting by an IMS client that the IMS call over LTE is in an alert state and a Radio Resource Control (RRC) reconfiguration cells are configured for the IMS call over LTE.

The example embodiments disclosed herein are to provide mechanisms for initiating by the IMS client a session alert refresh timer with a value less than a data inactivity timer value.

The example embodiments disclosed herein are to provide mechanisms for detecting by the IMS client that the session alert refresh timer has expired before establishing the IMS call over LTE.

The example embodiments disclosed herein are to provide mechanisms for restarting by the IMS client the session alert refresh timer and sending by the IMS client a SIP message to a network entity.

The example embodiments disclosed herein are to provide mechanisms for receiving by an Access Stratum (AS) client the RRC connection release message from the network entity.

The example embodiments disclosed herein are to provide mechanisms for detecting by the IMS client that LTE signal strength meets a low strength threshold and sending by the IMS client the SIP message to the network entity.

The example embodiments disclosed herein are to provide mechanisms for sending by the IMS client a silent message to the network entity to keep the RRC connection active.

The example embodiments disclosed herein are to provide mechanisms for indicating by the IMS client a status of the IMS call over LTE to a Non-access stratum (NAS) client.

The example embodiments disclosed herein are to provide mechanisms for receiving by the AS client the RRC connection release message from the network entity.

The example embodiments disclosed herein are to provide mechanisms for determining by the NAS client that the IMS call over LTE is in progress and sending by the NAS client a service to the AS client to update that the IMS call over LTE is in progress.

According to an example embodiment, a method for managing an IP multimedia subsystem (IMS) call over Long-Term Evolution (LTE) in a Single Radio Voice Call Continuity (SRVCC) area may include first detecting, by an IMS client a User Equipment (UE), that the IMS call over LTE is in an alert state and that a Radio Resource Control (RRC) reconfiguration cells are configured for the IMS call over LTE, initiating, by the UE, a session alert refresh timer with a value less than a value of a data inactivity timer from a network entity, second detecting, by the UE, that the session alert refresh timer has expired before establishing the IMS call over LTE, restarting, by the UE, the session alert refresh timer, and sending, by the UE, a Session Initiation Protocol (SIP) message to the network entity.

According to an example embodiment, a method for managing an IP multimedia subsystem (IMS) call over Long-Term Evolution (LTE) in a Single Radio Voice Call Continuity (SRVCC) area may include detecting, by a User Equipment (UE), that the IMS call over LTE is in an alert state and a Radio Resource Control (RRC) reconfiguration cells are configured for the IMS call over LTE, receiving, by the UE, a RRC connection release message from a network entity, determining, by the UE, whether a strength of an LTE signal meets a strength threshold, and sending, by the UE, a Session Initiation Protocol (SIP) message to the network entity to keep an RRC connection active.

According to an example embodiment, a method for managing an IP multimedia subsystem (IMS) call over Long-Term Evolution (LTE) in a Single Radio Voice Call Continuity (SRVCC) area may include detecting, by a User Equipment (UE), that the IMS call over LTE is in an alert state and a Radio Resource Control (RRC) reconfiguration cells are configured for the IMS call over LTE, and sending, by the UE, a silent message to the network entity to keep the RRC connection active.

According to an example embodiment, a method for managing an IP multimedia subsystem (IMS) call over Long-Term Evolution (LTE) in a Single Radio Voice Call Continuity (SRVCC) area may include detecting, by a User Equipment (UE), that the IMS call over LTE is in an alert state and a Radio Resource Control (RRC) reconfiguration cells are configured for the IMS call over LTE, indicating, by the UE, a status of the IMS call over LTE to a Non-access stratum (NAS) client included in the UE, receiving, by the UE, a RRC connection release message from a network entity, determining, by the UE, that the IMS call over LTE is in progress, and sending, by the UE, a service request message to the AS client to update that the IMS call over LTE is in progress.

According to an example embodiment, a User Equipment (UE) for managing an IP multimedia subsystem (IMS) call over Long-Term Evolution (LTE) in a Single Radio Voice Call Continuity (SRVCC) area may include an IMS client including at least one processor, which is configured to detect that the IMS call over LTE is in an alert state and a Radio Resource Control (RRC) reconfiguration cells are configured for the IMS call over LTE, initiate a session alert refresh timer with a value less than a value of a data inactivity timer, detect that the session alert refresh timer has expired before establishing the IMS call over LTE, restart the session alert refresh timer, and send a Session Initiation Protocol (SIP) message to a network entity.

According to an example embodiment, a User Equipment (UE) for managing an IP multimedia subsystem (IMS) call over Long-Term Evolution (LTE) in a Single Radio Voice Call Continuity (SRVCC) area may include an IMS client and an Access Stratum (AS) client. The IMS client may include at least one processor, which is configured to detect that the IMS call over LTE is in an alert state and a Radio Resource Control (RRC) reconfiguration cells are configured for the IMS call over LTE, detect that a LTE signal strength meets a low strength threshold, and send a Session Initiation Protocol (SIP) message to the network entity. The AS client may include at least one processor, which is configured to receive a RRC connection release message from a network entity.

According to an example embodiment, a User Equipment (UE) for managing an IP multimedia subsystem (IMS) call over Long-Term Evolution (LTE) in a Single Radio Voice Call Continuity (SRVCC) area may include an IMS client including at least one processor, which is configured to detect that the IMS call over LTE is in an alert state and a Radio Resource Control (RRC) reconfiguration cells are configured for the IMS call over LTE, and send a silent message to the network entity to keep the RRC connection active.

According to an example embodiment, a User Equipment (UE) for managing an IP multimedia subsystem (IMS) call over Long-Term Evolution (LTE) in a Single Radio Voice Call Continuity (SRVCC) area may include an IMS client, an Access Stratum (AS) client, and a Non-access stratum (NAS) client. The IMS client may include at least one processor, which is configured to detect that the IMS call over LTE is in an alert state and a Radio Resource Control (RRC) reconfiguration cells are configured for the IMS call over LTE, and indicate a status of the IMS call over LTE to the NAS client. The AS client may include at least one processor, and may be configured to receive a RRC connection release message from a network entity. The NAS client may include at least one processor and may be configured to determine that the IMS call over LTE is in progress, and send a service request message to the AS client to update that the IMS call over LTE is in progress.

According to an example embodiment, a method for managing an IP multimedia subsystem (IMS) call over Long-Term Evolution (LTE) in a Single Radio Voice Call Continuity (SRVCC) area may include first determining, by a User Equipment (UE), whether the IMS call over LTE is in an alert state and that a Radio Resource Control (RRC) is in a connected state for the IMS call over LTE, initiating, by the UE, a session alert refresh timer with a value less than a value of a data inactivity timer from a network entity once the UE has moved to an alert state, second determining, by the UE, whether the session alert refresh timer has expired before establishing the IMS call over LTE, and sending, by the UE, a Session Initiation Protocol (SIP) message to the network entity to keep the RRC connected These and other aspects of the example embodiments disclosed herein will be better appreciated and understood when considered in conjunction with the following description and the accompanying drawings. It should be understood, however, that the following descriptions, while indicating some example embodiments and specific details thereof, are given by way of illustration and not of limitation. Many changes and modifications may be made within the scope of example embodiments without departing from the spirit thereof.

BRIEF DESCRIPTION OF DRAWINGS

Various example embodiments of the inventive concepts are illustrated in the accompanying drawings, throughout which like reference letters indicate like parts in the various figures. The example embodiments disclosed herein will be better understood from the following description with reference to the drawings, in which.

DETAILED DESCRIPTION

The example embodiments disclosed herein and the various features and advantageous details thereof are explained more fully with reference to the non-limiting example embodiments that are illustrated in the accompanying drawings and detailed in the following description. Descriptions of well-known components and processing techniques are omitted so as to not unnecessarily obscure the example embodiments herein. Also, the various example embodiments described herein are not necessarily mutually exclusive, as some example embodiments can be combined with one or more other example embodiments to form new example embodiments. The term "or" as used herein, refers to a non-exclusive or, unless otherwise indicated. The examples used herein are intended merely to facilitate an understanding of ways in which the example embodiments herein can be practiced and to further enable those skilled in the art to practice the example embodiments herein. Accordingly, the disclosed example embodiments should not be construed as limiting the scope of example embodiments of the present inventive concepts.

Figure 1:
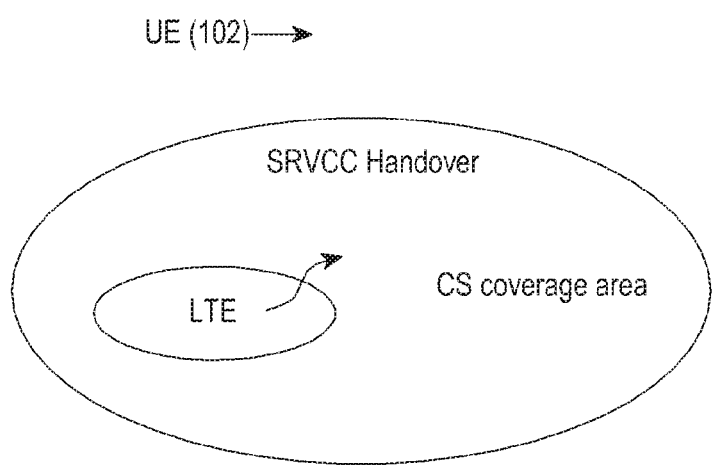
FIG. 1 is an overview of a wireless communication network in which a UE performs a handover in a SRVCC area, according to a related art.
Figure 2:
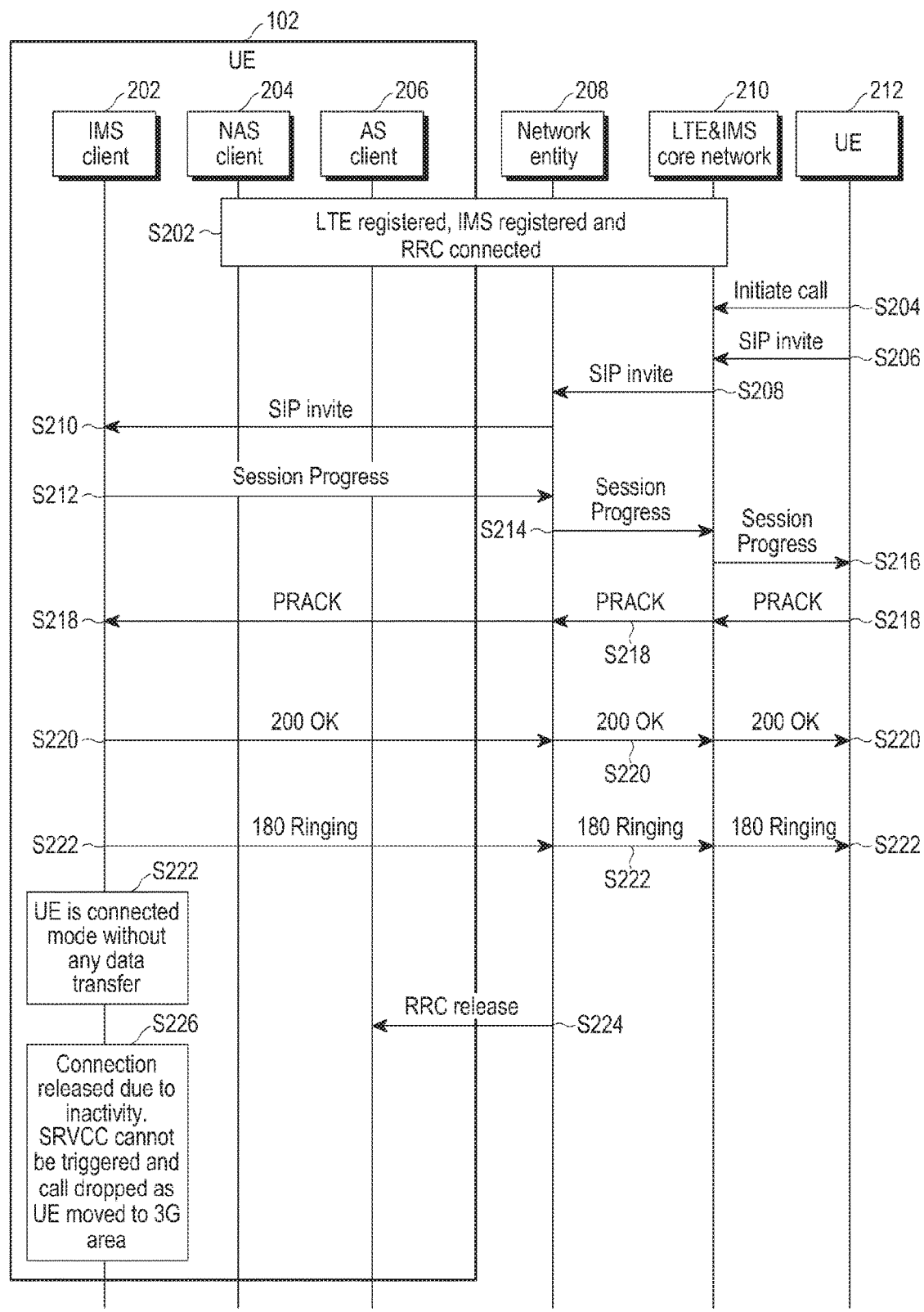
FIG. 2 illustrates a sequence diagram in which a call is dropped due to inactivity and RRC connection release, according to a related art.

For example, as illustrated in a sequence diagram FIG. 2, when a UE 212 is powered up, the UE 212 may search for wireless networks (e.g., LTE) from which it can receive communication services. The UE 212 can be configured to select an available wireless network (or one of available wireless networks based on priority if more than one wireless network are present) to establish the RRC connection with a network entity 208. The UE 212 may perform registration with a core network entity 210 for establishing the IMS call over LTE with the UE 102 (S202). The core network entity 210 entity may include LTE and IMS core networks. The UE 212 after performing the registration procedure may operate in a connected mode to actively communicate with the core network entity 210 and with the UE 102 registered on the core network entity 210 (e.g., LTE registered, IMS registered, and RRC connected). The UE 212 may initiate the IMS call with the UE 102 (S204). The UE 212 may include various supported codecs. This information is included as a first Session Description Protocol (SDP) offer in an initial invite.

The IMS client of the UE 212 may generate a Session Initiation Protocol (SIP) INVITE and send the SIP INVITE (or alternatively, SIP request message) to the core network entity 210 (to originating Proxy-Call Session Control Function (P-CSCF)) (S206). The SIP INVITE may contain Route entries for the UE 212 and the Serving-Call Session Control Function (S-CSCF) address that has been extracted from the Service-Route header in the registration "200 OK" message. Security ports setup for Internet Protocol Security Association (IPSec SA) establishment may be used. "To" and "From" headers may also be included in the SIP INVITE. These headers may not play a role in a call processing. The SIP INVITE may be sent using a registration time so that the core network entity 210 or the originating P-CSCF accepts the request. The originating P-CSCF may verify that the preferred public identity specified in the SIP request message is currently registered. The originating S-CSCF address for the user may be obtained at the time of registration (Service-Route header in the "200 OK" in response to a REGISTER message (not shown)).

The originating Proxy Call Session Control Function (P-CSCF) may query a Domain Name System (DNS) to obtain an Internet Protocol (IP) address of the S-CSCF in the UE 212 subscriber's home network (e.g., IMS network). The originating S-CSCF address for the user may be obtained at the time of registration (Service-Route header in the "200 OK" in response to the REGISTER message (not shown)). The originating P-CSCF may replace the preferred identity header with an asserted identity header and forward the SIP INVITE to the originating S-CSCF in the home network of the UE 212 (S208). During this step, a Record-Route header may be added to the IP address. The originating P-CSCF may acknowledge receipt of the SIP INVITE to the UE 102. The "100 Trying" message (not shown) may indicate that the call setup is in progress (S212). The originating S-CSCF may query the DNS to obtain the IP address of an Interrogating-Call State Control Function (I-CSCF) in the UE 102 subscriber's home network. The P-CSCF may send the SIP INVITE (or alternatively, SIP request message) to the C-CSCF (S208). The C-CSCF may send the SIP INVITE to an IMS client 202 (S210).

The S-CSCF of the UE 102 subscriber's home network may remove the Route header and routes from the SIP INVITE (or alternatively, SIP request message) to obtain the I-CSCF IP address from the DNS query. Note that the S-CSCF has added the telephone URL to the P-Asserted-Identity. Via and Record-Route headers may also be updated with self-address. The I-CSCF may query the Subscription Location Function (SLF) to identify a Home Subscriber Server (HSS) that needs to be queried. The S-CSCF may acknowledge the SIP INVITE (or alternatively, SIP request message) that has been received from the originating P-CSCF query so that the HSS obtains the S-CSCF for the user. As a part of the message processing, a route entry may be added for the Term S-CSCF. A new Via header may be added to record that the message traversed this I-CSCF. The message may be forwarded to the first route header (in this case, the "Term S-CSCF").

The public Uniform Resource Identifier (URI) may be mapped to the called subscriber's registered IP address and port number. The public URI in the SIP INVITE may be replaced with the IP address and port number registered in the UE 102. The SIP INVITE may be routed to the P-CSCF IP address that has been recorded at the time of registration. The Via and Record-Route headers may be updated. The terminating P-CSCF may request a Policy Decision Function (PDF) to generate a media authorization token. The token may be included in the SIP request message (e.g., SIP INVITE) sent to the terminating UE. The P-CSCF may update the Via and Route-Record headers and forward the SIP request message to the Called UE. Note that the secure port may be included in a Via address specification.

The UE 102 may have the SDP list of available codecs. The list can be made compact by excluding codecs that are not supported by the UE 102 home subscriber. This list may be included in a Session Progress message sent to the UE 212 (S216) via the core network entity 210 (e.g., P-CSCF) (S214). The originating P-CSCF may request the PDF to generate a media authorization token. The token may be included in the Session Progress message sent to the originating UE 212 (S216). The originating P-CSCF may remove its own entry from the Via header. The originating P-CSCF may also update the Record-Route header to include a protected port number in its entry. Accordingly, all responses can be sent using the protected IPSec SA. The UE 212 may examine the received list of common codecs and select a codec to activate. The UE 102 may receive a PRACK from the UE 212 (S218). The PRACK may include the UE 102 subscriber about the selected Codec. The PRACK message may also indicate that currently the resources needed for meeting the quality of service requirements of the session are not available.

Now that the codec to be used has been selected, an Evolved Packet System (EPS) dedicated bearer activation may be initiated for allocating resources for meeting the Quality of Service (QoS) requirements for the codec. The UE 102 subscriber may acknowledge the PRACK. The PRACK message may also indicate that quality of service for the session is not met for the UE 102 subscriber. The final codec at the UE 102 side may be decided. Then, the network may initiate the EPS dedicated bearer activation to allocate resources for meeting the QoS of the terminating leg of the call.

The EPS dedicated bearer activation may be completed in the UE 212. Because the EPS dedicated bearer has been activated in the UE 212, the UE 102 may notify that the UE 212 can now meet the quality of service in the send and receive direction. The UE 212 may reply back to the UE 102 user. However, the Local QoS still may not be set because the EPS dedicated bearer activation has not been completed in the UE 102. Once the EPS dedicated bearer activation has been completed in the UE 102, the EPS dedicated bearer contexts are active both in the UE 212 and the UE 102. The QoS for the call can now be met.

Now all the resources for the call may be in place. The fact that the UE 102 subscriber receives a call and is notified about the incoming call, and the UE 212 is informed that the UE 102 subscriber is receiving the call may indicate to the UE 212 that the QoS at the UE 102 has also been met. The UE 212 may acknowledge the ringing. The UE 102 subscriber may acknowledge the PRACK and notify the UE 212 that that the call has been answered. The UE 102 may send the "200 OK" message to the UE 212 (S220). At this point, the call is ready to enter a conversation mode.

When the UE 102 is in a ringing state (S222) for VoLTE (e.g., IMS call over LTE, or Mobile Terminal (MT) call), the network entity could release the RRC connection (S224) due to data inactivity (S226). When the RRC connection is released, the UE 102 may moves to idle state, hence the MR may not be sent to network. If the network doesn't receive the measurement reports, the SRVCC handover procedure may not be triggered by the network entity when a signaling condition on LTE are bad and when the UE 102 moves towards 3G area and/or out of LTE coverage. This may lead to call drops.

Figure 3:
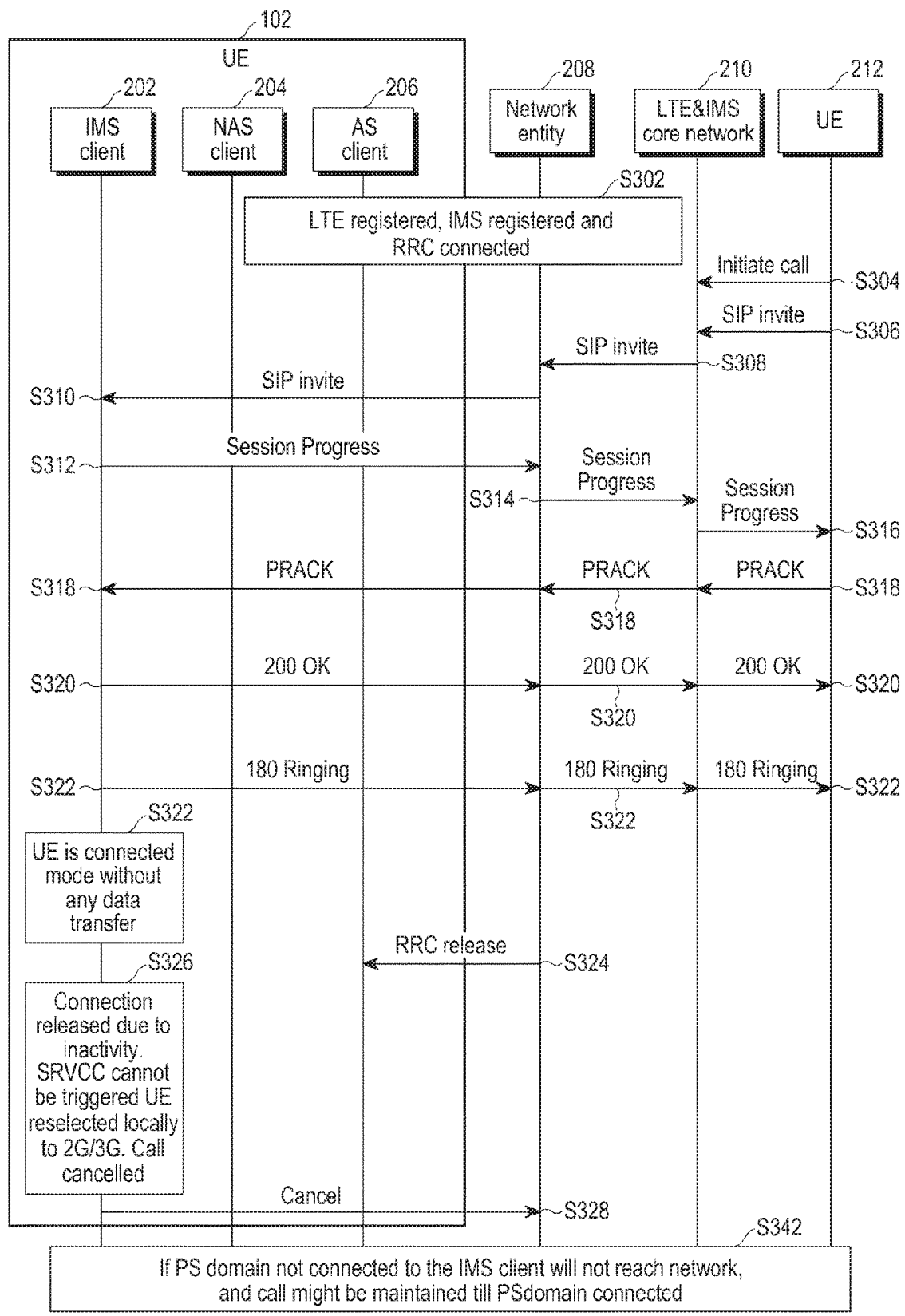
FIG. 3 illustrates a sequence diagram in which a call is dropped due to Call State Mismatch while the user cancels/Disconnects call in RRC idle mode, according to a related art.

As illustrated in a sequence diagram FIG. 3, the IMS call over LTE establishment from operations S302-S320 may be the same or substantially similar to the operations S202-S220 as illustrated in the FIG. 2. When the UE 102 is in ringing state for the IMS call over LTE (S322) (or, Mobile Terminal (MT) call), the network entity 208 could release the RRC connection (S324) due to data inactivity (S326). The problem can occur when user cancelled/disconnected the call during SRVCC handover (S326). In detail, the user can triggered the VoLTE call while the UE 102 moves to 2G or 3G area, and cancels the call before the SRVCC handover t. In such case, the UE 102 can send cancel notification to the network entity 208 (S328) but no response will be received because the UE 102 moved to 2G/3G due to the SRVCC handover. Here the IMS state and the Call Control (CC) state can be asynchronous to each other and it may end up with maintaining call on the network side. The packet switching (PS) domain not connected with the IMS client may not reach the network entity, and the call may be maintained until PS domain is connected (S342).

Referring now to the drawings, more particularly to FIGS. 4 through 12, where similar reference characters denote similar features consistently throughout the figures, some example embodiments are described below.

The core network entities such as originating P-CSCF, originating S-CSCF, I-CSCF, S-CSCF, and the P-CSCF are not shown in the drawings, because such core network entities are common wireless communication systems.

Figure 4:
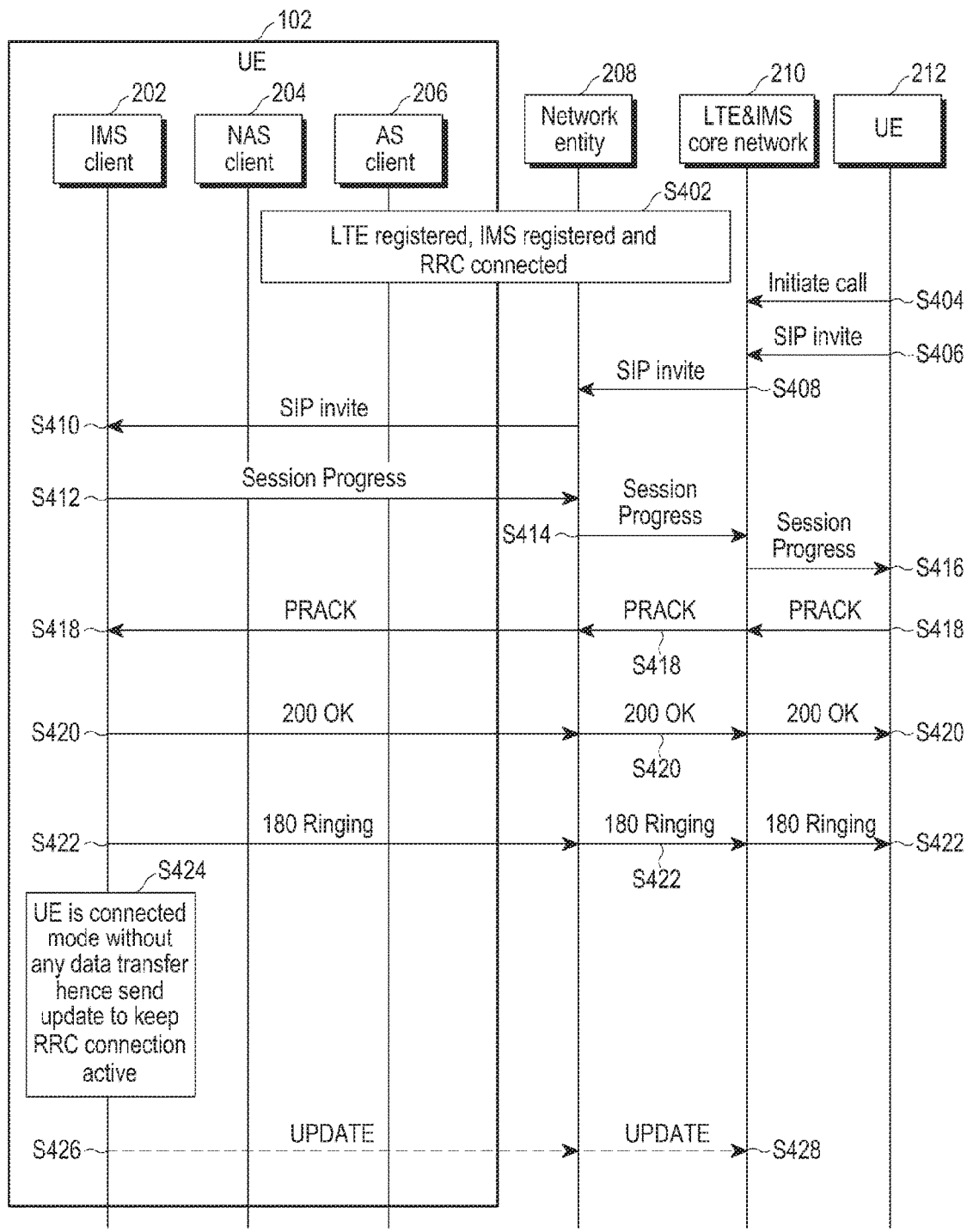
FIG. 4 illustrates a sequence diagram in which a UE sends SIP message to a network entity based on session-alert refresh timer, according to an example embodiment as disclosed herein.

FIG. 4 illustrates a sequence diagram in which a UE 102 sends SIP message to a network entity 208 based on a session-alert refresh timer (now shown), according to an example embodiment as disclosed herein. The IMS call establishment operations (S402-S422) may be the same or substantially similar to the operations (S202-S222) as illustrated in the FIG. 2. In an example embodiment, an IMS client 202 at the UE 102 can be configured to determine a data inactivity interval (e.g., UE 102 in the RRC connected state without any data activity (no data transferred/received)). Once the UE 102 has moved to ringing state (e.g., call alert sate), the session alert refresh timer with a value less than a data inactivity timer value will be started. The session alert refresh timer can be described as a timer. Thereafter, sending the SIP message to the network entity 208 (S420 may keep the RRC connection active.

Figure 5:
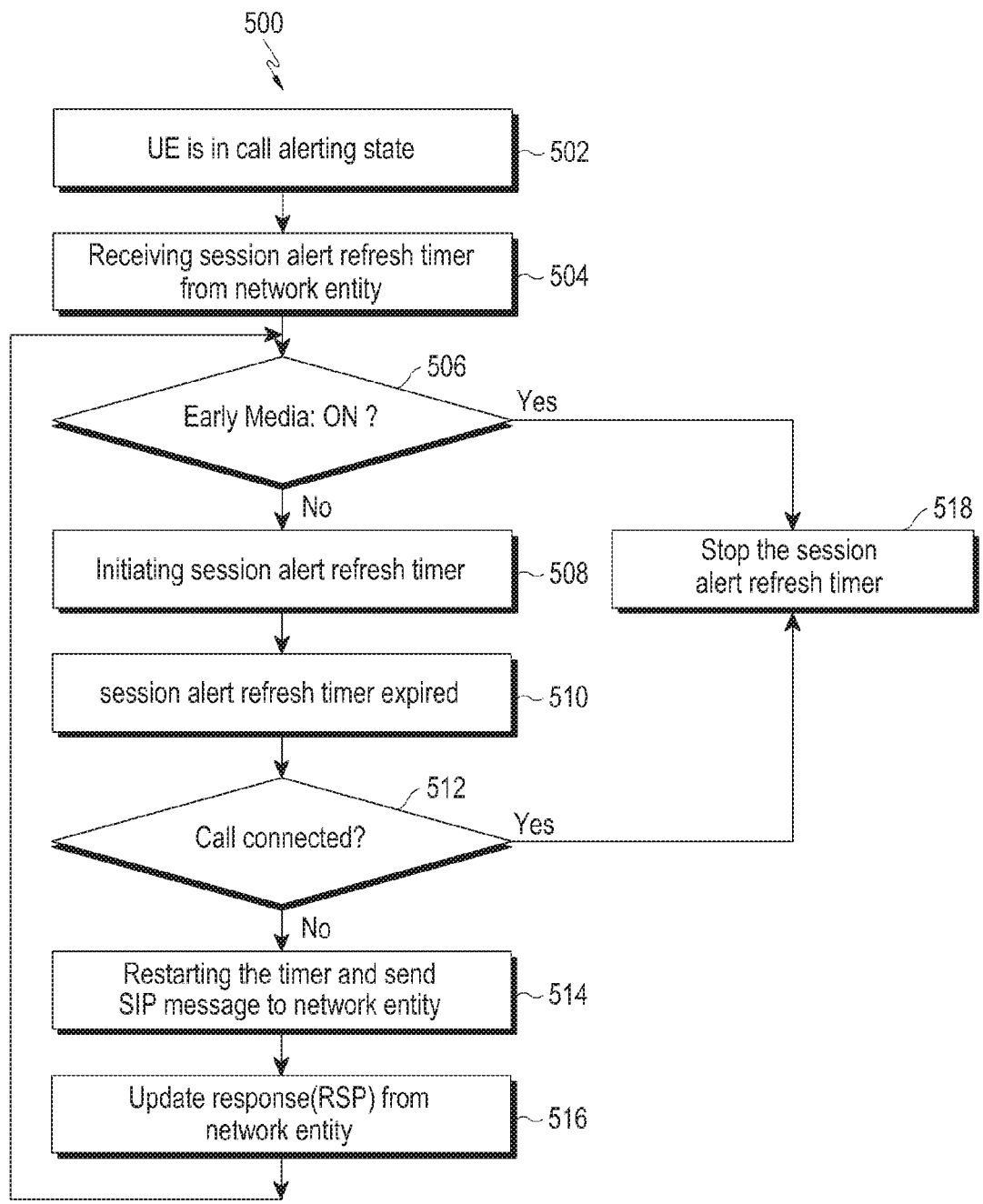
FIG. 5 illustrates a flow diagram in which a UE sends SIP message to a network entity based on Session-Alerting refresh timer, according to an example embodiment as disclosed herein.

FIG. 5 illustrates a flow diagram 500 in which the UE 102 sends the SIP message to a network entity 208 based on the session-alert refresh timer, according to an example embodiment as disclosed herein. At operation 502, the method may include determining that the UE 102 is in call alert state (e.g., ringing state). In an example embodiment, the method allows the IMS client 202 to determine that the UE 102 is in the call alert state. At operation 504, the method includes receiving the session alert refresh timer from the network entity 208. In an example embodiment, the method allows the IMS client 202 to receive a session alert refresh timer value from the network entity.

At operation the 506, the method includes determining by the IMS client 202 whether an early media is configured for the UE 102. The early media may include, for example, caller tune, or media pre-configured prior to the call being answered. In an example embodiment, the method allows the IMS client 202 to determine whether the early media is configured for the UE 102.

If the IMS client 202, at operation 506, determines that the early media is not configured, then at step 508, the method may perform initiating the session alert refresh timer.

At operation 510, the method may determine whether the session alert refresh timer has expired.

At operation 512, the method includes determining whether the IMS call over LTE is connected. In an example embodiment, the method allows the IMS client 202 to determine whether the IMS call over LTE is connected. If the IMS client 202, at operation, 510, determines that the IMS call over LTE is not connected, then at operation 514, the method may restart the session alert refresh timer and send the SIP message with reason session alert refreshing indicating the reason for restarting the session alert refresh timer to the network entity 208. In an example embodiment, the method allows the IMS client 202 to restart the session alert refresh timer and send the SIP message with reason session alert refreshing to the network entity 208.

At operation 516, the method includes updating a response (RSP) received from the network entity 208. If the IMS client 202, at operation 512 determines that the IMS call over LTE is connected, then, the method may terminate the session alert refresh timer at operation 518. In an example embodiment, the method allows the IMS client 202 to terminate the session alert refresh timer.

The session alert refresh timer can be negotiated in the SIP signaling exchange with the network entity 208 during the establishing of the IMS call over LTE. The UE 102 may be configured to receive the data inactivity timer value from the network entity 208. For example, the data in-activity timer value may be "10 seconds." Unlike the conventional systems and methods, the UE 102 according to some example embodiments may include the session alert refresh timer, which is configured to be set at a value less than the data inactivity timer value received from the network entity 208. For example, the IMS client 202 at the UE 102 can be configured to set the value of the session alert refresh timer to "8 seconds". Thus, the IMS client 202 upon expiry of the session alert refresh timer (e.g., at the 8 seconds before an expiry of the data inactivity timer (e.g., 10 seconds)) can be configured to re-start the session alert refresh timer and send the SIP message to the network entity 208 to keep the UE in the RRC connected state.

The various actions, acts, blocks, operations, or the like in the method in the flow diagram 500 may be performed in the order presented, in a different order or simultaneously. Further, in some embodiments, some of the actions, acts, blocks, steps, or the like may be omitted, added, modified, skipped, or the like without departing from the scope of the inventive concepts.

Figure 6:
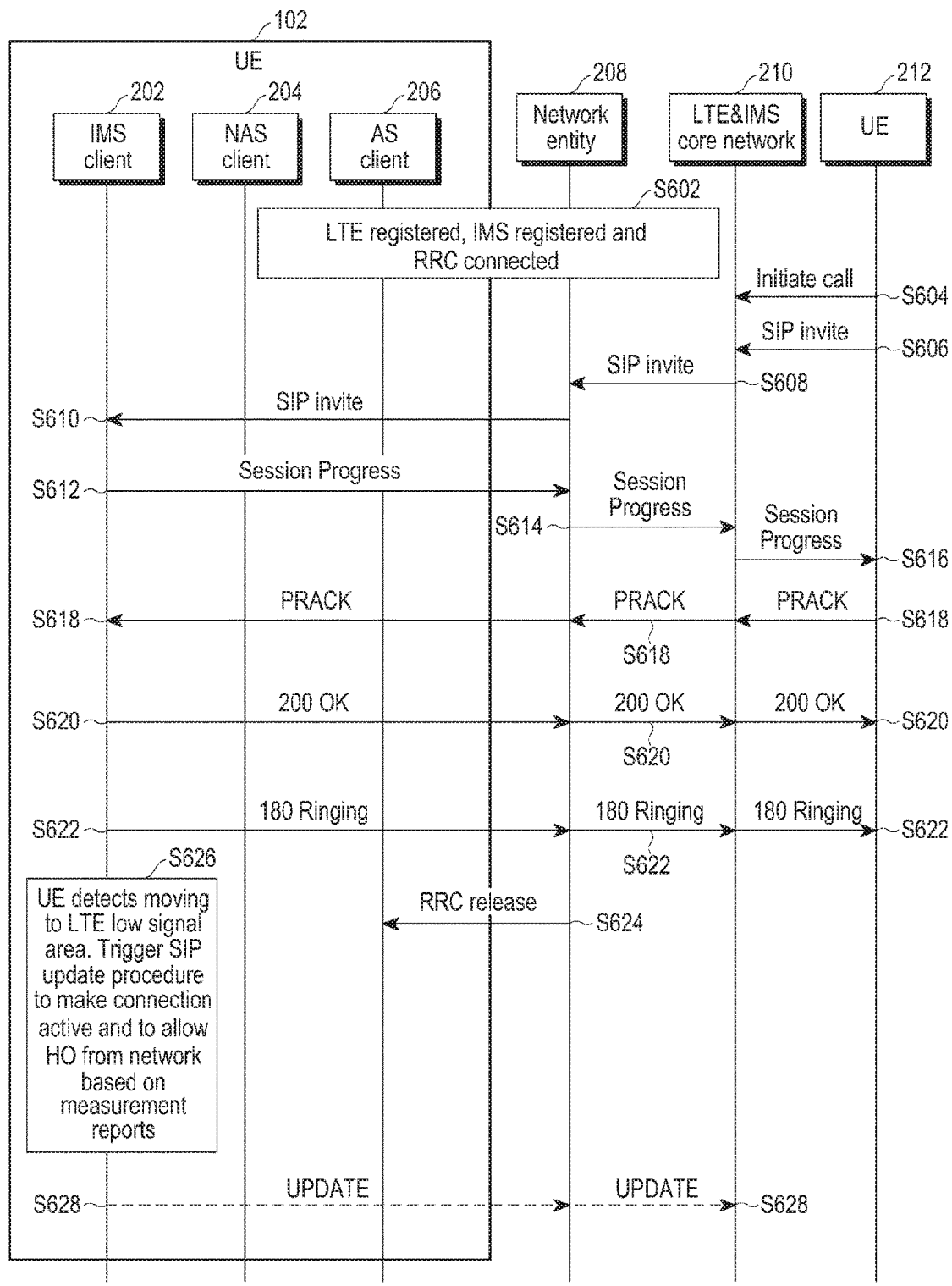
FIG. 6 illustrates a sequence diagram in which a UE sends SIP message to a network entity based on LTE signal strength, according to an example embodiment as disclosed herein.

FIG. 6 illustrates a sequence diagram in which the UE 102 sends the SIP message to the network entity 208 based on the LTE signal strength, according to an example embodiment as disclosed herein. The IMS call establishment from operations (S602-S622) may be the same or substantially similar to the operations (S202-S222) as illustrated in the FIG. 2. The UE 102 receives (S624) the RRC connection release message from the network entity 208 when the IMS call over LTE is in progress. The UE 102 in a RRC idle state (or during the RRC reselection procedure) may detect that the LTE low signal strength threshold is met (e.g., the UE 102 moving into the low network signal area), and may therefore trigger (S626) the SIP message (S628) to the network entity 208 to keep the IMS call over LTE session active.

Figure 7:
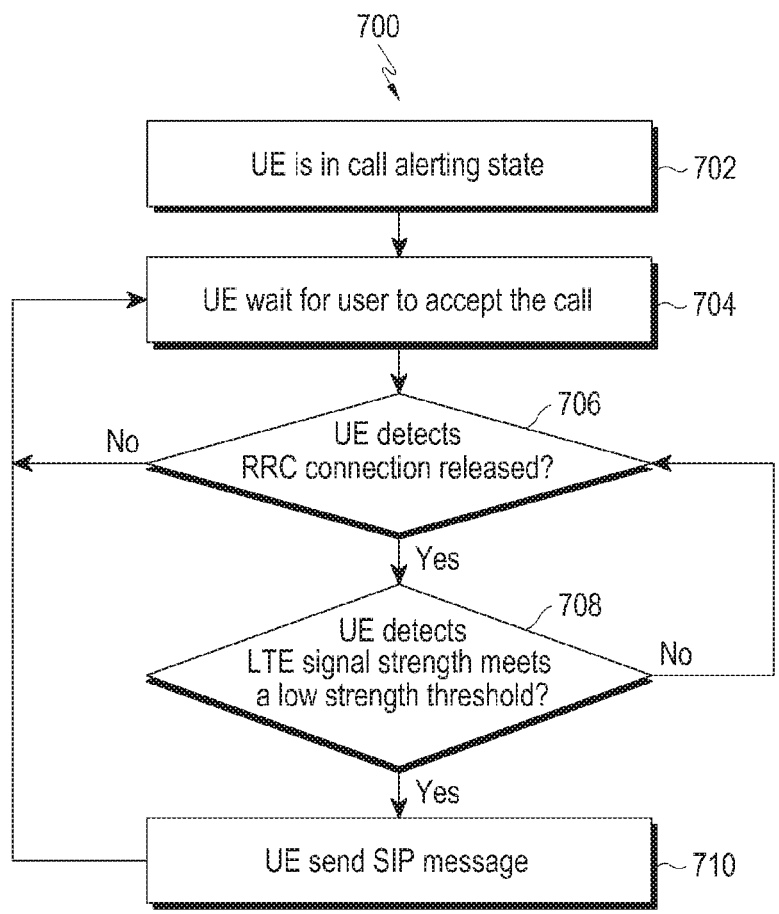
FIG. 7 illustrates a flow diagram in which a UE sends SIP message to a network entity based on LTE signal strength, according to an example embodiment as disclosed herein.

FIG. 7 illustrates a flow diagram 700 in which the UE 102 sends the SIP message to the network entity 208 based on the LTE signal strength, according to an example embodiment as disclosed herein. At operation 702, the method may determine that the UE 102 is in the call alert state (e.g., ringing state). In an example embedment, the method may allow the IMS client 202 to determine that the UE 102 is in the call alert state. At operation 704, the method may allow an awaiting window for the user of the UE 102 to accept the IMS call over LTE from the UE 212.

At operation 706, the method may determine whether the RRC connection is released. In an example embodiment, the method may allow the IMS client 202 to determine whether the RRC connection is released. If, at operation 706, the IMS client 202 determines that the RRC connection is not released, then the UE 102 goes back to operation 704.

If, at operation 706, the IMS client 202 determines that the RRC connection for the UE 102 is released then at step 708, the method may determine whether the LTE signal strength meets the LTE low signal strength threshold configured by the UE 102. In an example embodiment, the method may allow the IMS client 202 to determine whether the LTE signal strength meets the low signal strength.

If, at operation 708, the IMS client 202 determines that the UE 102 meets the LTE low signal strength threshold, then at operation 710 the method may send the SIP message to the network entity 208 to keep the session (e.g., IMS call over LTE session or the RRC connection) active. If, at operation 708, the IMS client 202 determines that the UE 102 does not meets the LTE low signal strength, then the UE 102 goes back to operation 706.

In the conventional methods and systems, when the IMS call over LTE session is active and the RRC connection is released due to low LTE signal strength, the network may not be able to locate the location of the UE 102 and the UE 102 may switch to RRC idle state. Thus, the network entity 208, in RRC idle state, may not trigger the handover commands (e.g., SRVCC handover commands, 2G/3G handover commands, or the like) as required by the UE 102, and thus may encounter the call drop.

Unlike the conventional methods and systems, according to the methods and/or UE according to some example embodiments of the inventive concepts, once the RRC connection is released, the UE 102 can be configured to detect the low LTE signal strength by configuring the low LTE single threshold. Once the UE 102 meets the low LTE single threshold, the UE 102 can be configured to send the SIP message to keep the IMS call over LTE session active.

The various actions, acts, blocks, steps, or the like in the method in the flow diagram 700 may be performed in the order presented, in a different order from the order presented herein, or simultaneously. Further, in some example embodiments, some of the actions, acts, blocks, steps, or the like may be omitted, added, modified, skipped, or the like without departing from the scope of the inventive concepts.

Figure 8:
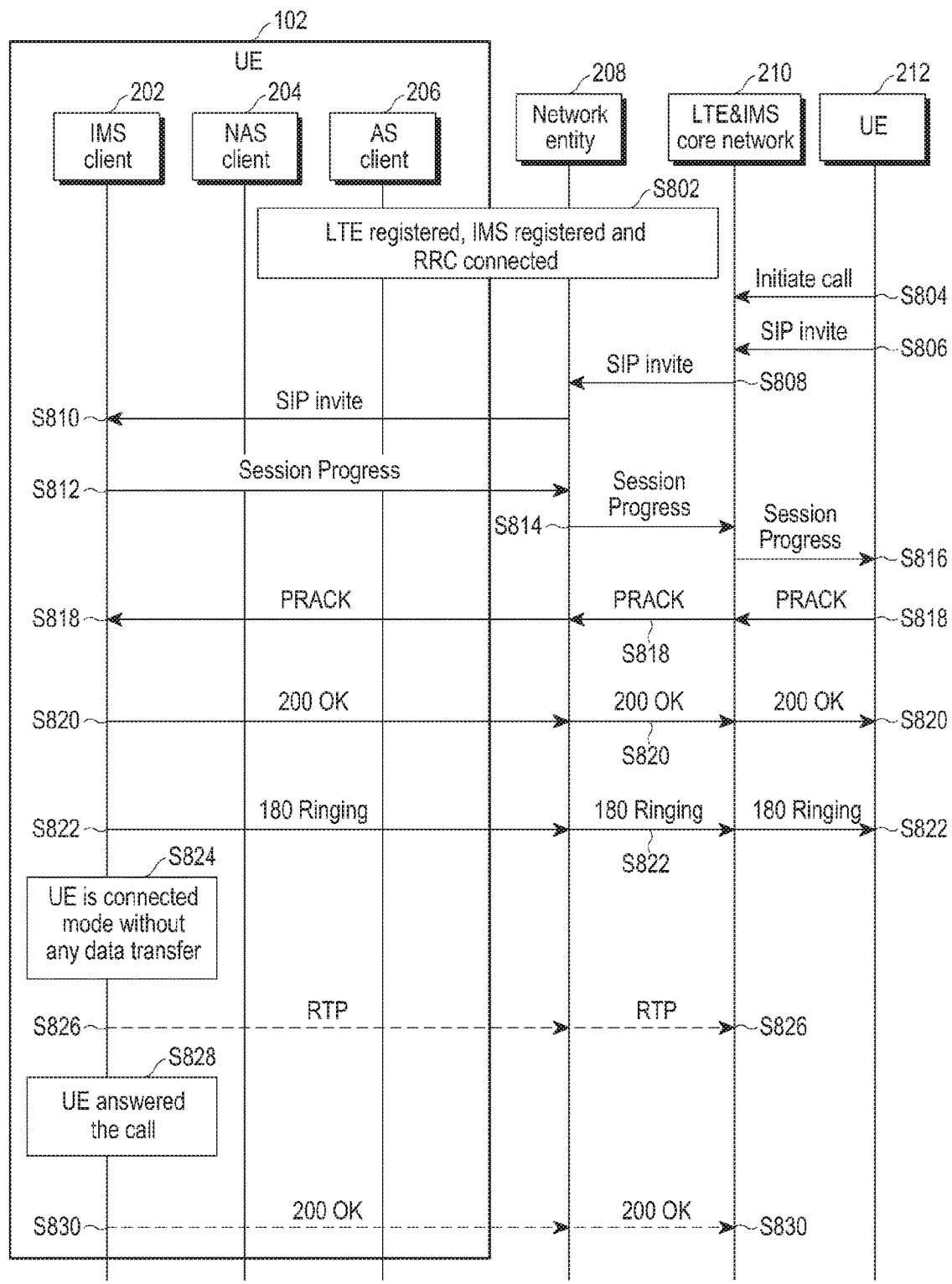
FIG. 8 illustrates a sequence diagram in which a UE sends a silent packets to a network entity to keep a RRC connection active, according to an example embodiment as disclosed herein.

FIG. 8 illustrates a sequence diagram in which the UE 102 sends silent packets to the network entity 208 to ensure that the RRC connection is active, according to an example embodiment as disclosed herein. The IMS call over LTE establishment from operations (S802-S822) may be the same or substantially similar to the operations (S202-S222) as illustrated in the FIG. 2. Once the UE 102 is in call alert state (S822) and RRC connected state without any data transfer (S824), the IMS client 202 may be configured to initiate an audio engine with received media information from the network entity 208 to initiate a new media session of a type having a SEND ONLY direction to send silent packets (S826). The silent packets (e.g., dummy audio packets) may be sent over a Real-time Transport Protocol (RTP) signaling messages to keep the RRC connection active, and avoid release from the network entity 208 until the call is answered. These silent packets may be ignored by the network entity 208. Once the IMS client determines that the call has been answered by the user (S828), the IMS client 202 may send the acknowledgment message '200 OK" to the network entity 208 (S830).

Figure 9:
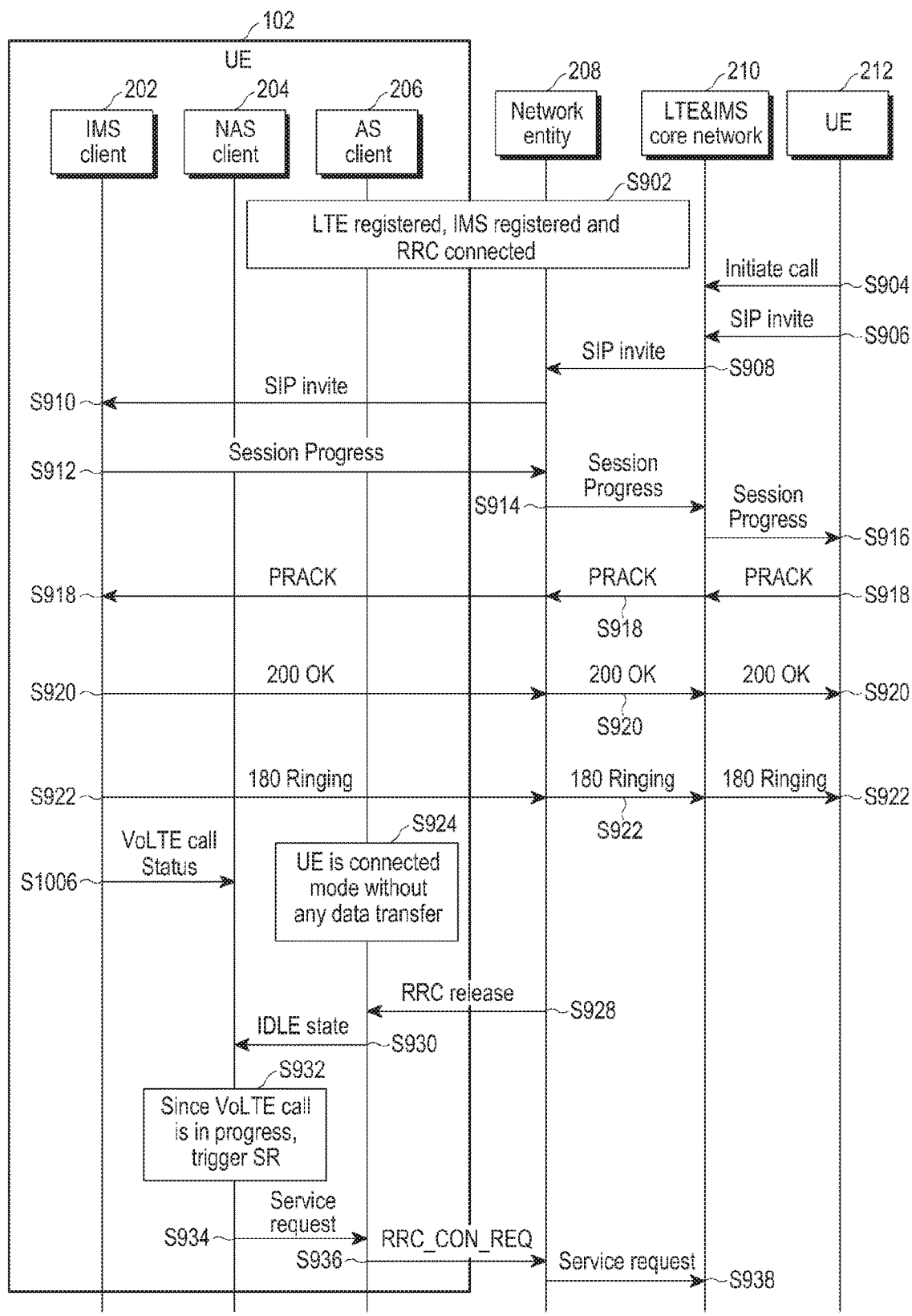
FIG. 9 illustrates a sequence diagram in which a UE sends a SIP message to a network entity based on NAS protocol, according to an example embodiment as disclosed herein.

FIG. 9 illustrates a sequence diagram in which a UE sends a SIP message to a network entity based on the NAS client 204 protocol, according to an example embodiment as disclosed herein. The IMS call over LTE establishment from operations (S902-S922) may be the same as or substantially similar to the operations (S202-S222) as illustrated in the FIG. 2. The IMS client 202 may be configured to indicate the status of the IMS call over LTE (e.g., VoLTE call status) to the NAS client 204 (S1006). The status that the UE 102 may be in the RRC connected mode without any data transfer (S924). The AS client 206 may be configured to receive the RRC connection release message from the network entity 208 (S928). The AS client may forward the RRC idle connection state to the NAS client 204 (S930). The NAS client 204 may determine whether the IMS call over LTE is in progress (e.g., in the RRC idle state, as the RRC connection is released). If NAS client 204 determines that the IMS call over LTE is in progress, the NAS client 204 may trigger and send a service request (SR) to the network entity 208 (S934 and S936). For example, the SR may be forwarded to the AS client 206 (S934), and the AS client 206 may queue the SR received from the NAS client 204, and forward the RRC connection request message to the network entity 208 (S936). The network entity 208 may then forward the SR to the core network entity 210 (S938). These operations (S930-S938) may be repeated until the user of the UE 102 responds to the call.

Figure 10:
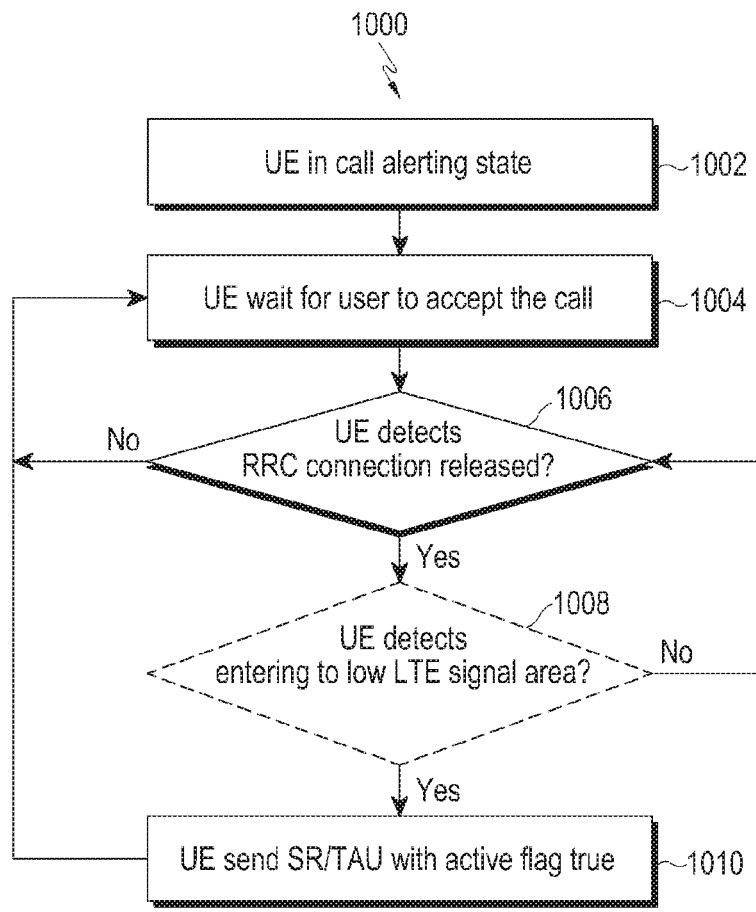
FIG. 10 illustrates a flow diagram in which a UE sends SIP message to a network entity based on NAS protocol and LTE signal strength, according to an example embodiment as disclosed herein.

FIG. 10 illustrates a flow diagram 1000 in which the UE 102 sends the SIP message to the network entity 208 based on the NAS protocol and the LTE signal strength, according to an example embodiment as disclosed herein. At operation 1002, the method may determine whether the UE 102 is in the call alert state (e.g., ringing state). In an example embedment, the method may allow the IMS client 202 to determine whether the UE 102 is in the call alert state. Once the UE 102 moves to the ringing state, the IMS client 202 at the UE 102 can be configured to indicate the call status (e.g., IMS call over LTE) to the NAS client 204. At operation 1004, the method may allow an awaiting window for the user of the UE 102 to accept the IMS call over LTE from the UE 212.

At operation 1006, the method may determine whether the RRC connection is released. In an example embodiment, the method may allow the IMS client 202 to determine whether the RRC connection is released. If, at operation 1006, the IMS client 202 determines that the RRC connection is not released then the UE 102 goes back to operation 1004.

If, at operation 1006, the IMS client 202 determines that the RRC connection for the UE 102 is released, then at operation 1008 (optionally), the method may determine whether the LTE signal strength meets the LTE low signal strength threshold, which is configured by the UE 102. In an example embodiment, the method may allow the IMS client 202 to determine whether the LTE signal strength meets the low signal strength.

If, at operation 1008, the IMS client 202 may determine that the UE 102 meets the LTE low signal strength threshold when an EPS Mobility Management (EMM) moves to the RRC idle state due to RRC connection release. Then at operation 1010, the method may trigger a service request (SR) message/Tracking Area Update (TAU) with active flag true from the UE 102 to move to the RRC connected state to receive the SRVCC handover commands from the network entity 208. The operations 1004 to 1010 will be repeated until Call is answered by user.

The UE 102 may be configured to maintain the call status as active when there is no SIP response received for ending the call during the SRVCC. After moving to 2G/3G the UE 102 can be configured to send disconnect indication to CC so that the IMS call over LTE is cleared on network side (e.g., network entity 208).

The various actions, acts, blocks, steps, or the like in the method in the flow diagram 1000 may be performed in the order presented, in a different order from the order presented herein, or simultaneously. Further, in some example embodiments, some of the actions, acts, blocks, steps, or the like may be omitted, added, modified, skipped, or the like without departing from the scope of the inventive concepts.

Figure 11:
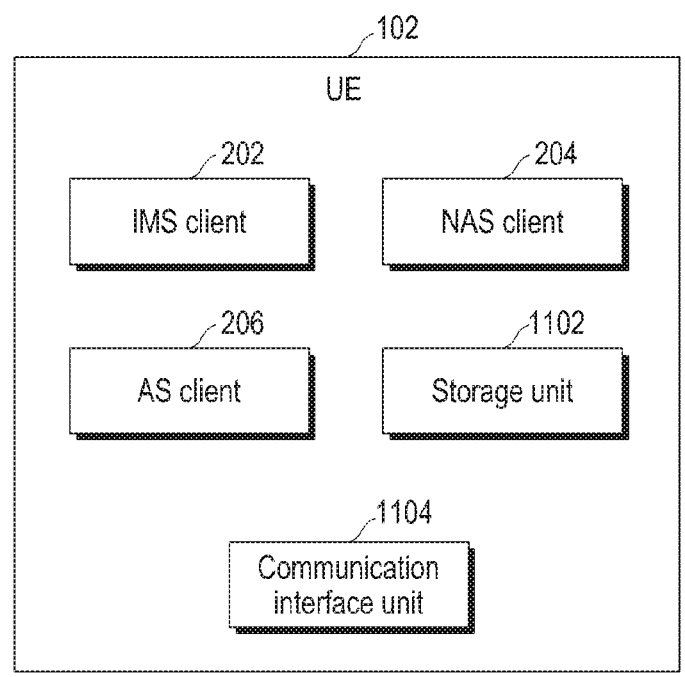
FIG. 11 illustrates various units of a UE for managing IMS call over LTE in a SRVCC area, according to an example embodiment as disclosed herein.

FIG. 11 illustrates various units of the UE 102 for managing the IMS call over LTE in the SRVCC area, according to an example embodiment as disclosed herein. In an example embodiment, the UE 102 may be, for example, a stationary or mobile, and may be referred to as a mobile station, a terminal, an access terminal, a subscriber unit, a station, etc. The UE 102 may be a cellular phone, a personal digital assistant (PDA), a wireless modem, a wireless communication device, a handheld device, a laptop computer, a cordless phone, a wireless local loop (WLL) station, electronic device, or the like. In an example embodiment, the UE 102 may include the IMS client 202, the NAS client 204, the AS client 206, the storage unit 1102, and a communication interface unit 1104. The one or more functions performed by the IMS client unit 202 have been described in conjunction with the FIGS. 4-10. The one or more functions performed by the NAS client unit 204 have been described in conjunction with the FIGS. 4-10. The one or more functions performed by the AS client unit 206 have been described in conjunction with the FIGS. 4-10.

The storage unit 1102 coupled to the UE 102 may include a random access memory (RAM) or another type of dynamic storage device that can store information and/or instructions (e.g., an application) for execution by a processor (e.g., controller unit), a read-only memory (ROM) device, or another type of static storage device. In an example embodiment, the storage unit 1102 may be configured to store the LTE low signal strength threshold. Further, the storage unit 1102 may be configured to store the session alert refresh timer value and the received data inactivity timer value.

The communication unit 1104 may be configured for communicating with external devices and internal devices through one or more wireless networks.

Figure 12:
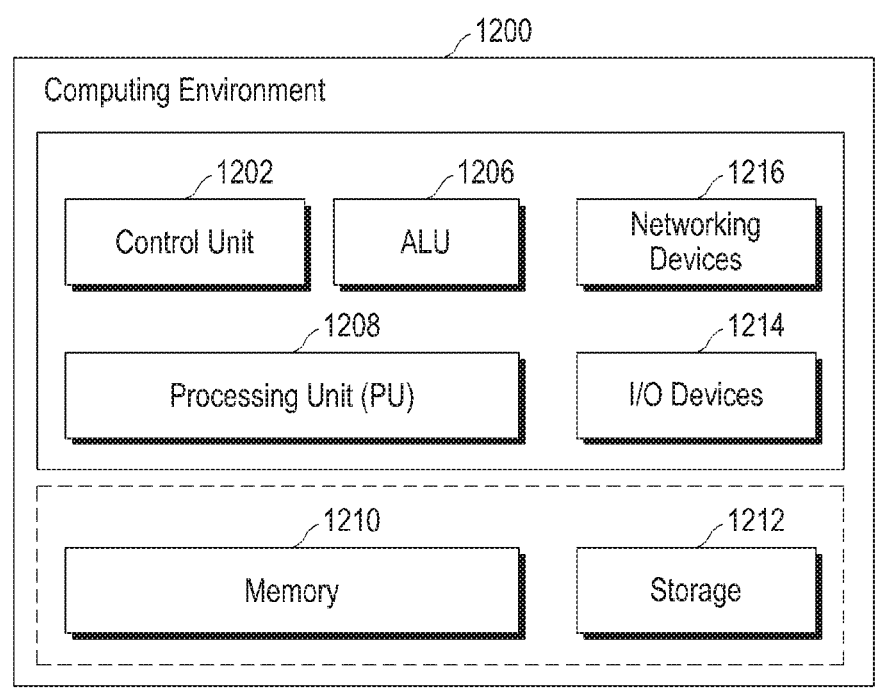
FIG. 12 illustrates a computing environment for managing IMS call over LTE in a SRVCC area, according to an example embodiment as disclosed herein.

FIG. 12 illustrates a computing environment implementing the method for managing the IMS call over LTE in a SRVCC area, according to some example embodiments as disclosed herein. As depicted in the FIG. 12, the computing environment 1200 may include at least one processing unit 1208, a control unit 1202, an Arithmetic Logic Unit (ALU) 1206, a memory 1210, a storage unit 1212, plurality of networking devices 1216 and a plurality input output (I/O) devices 1214. The processing unit 1208 may process instructions. The processing unit 1208 may receive commands from the control unit 1202 and perform processing. Further, any logical and arithmetic operations involved in the execution of the instructions may be computed by the ALU 1206.

The overall computing environment 1200 may be composed of multiple homogeneous and/or heterogeneous cores, multiple CPUs of different kinds, special media, and other accelerators. The processing unit 1208 may process instructions. Further, the plurality of processing unit 1208 may be implemented by a single chip or multiple chips.

Instructions and/or codes required for implementation of example embodiments may be stored in the memory unit 1210, the storage 1212, or both. At the time of execution, the instructions may be fetched from the corresponding memory 1210 or storage 1212, and executed by the processing unit 1208.

In case of any hardware implementations various networking devices 1216 or external I/O devices 1214 may be connected to the computing environment to support the implementation through the networking unit and the I/O device unit.

The example embodiments disclosed herein can be implemented through at least one software program running on at least one hardware device and performing network management functions to control the elements. The elements shown in the FIGS. 4 through 12 may include blocks which can be at least one of a hardware device, or a combination of hardware device and software module.

The methods and/or UE according to the example embodiments of the inventive concepts may be utilized to circumvent the call drop event at the UE (e.g., when the UE is in call alert state and call connected state) by evading the UE entering into the RRC idle state/during the SRVCC handover.

The methods and/or UE according to the example embodiments of the inventive concepts may keep the RRC connection active by triggering the SIP message (e.g., SIP update) to the network entity, whenever the UE detects an anomaly (e.g., data activity timer expired, low LTE signal strength parameters detected, or the like) while in the UE is in the RRC connected state during the SRVCC handover.

The methods and/or UE according to the example embodiments of the inventive concepts may maintain synchronization between the UE and the network, in case when the UE triggers Call Cancel or Disconnect request during the SRVCC handover.

The methods and/or UE according to the example embodiments of the inventive concepts may enable the UE to move back to the RRC connected state immediately with a help service request from the NAS client when IMS call over LTE establishment is in progress.

The foregoing description of the specific example embodiments will so fully reveal the inventive concepts that others can, by applying current knowledge, readily modify or adapt such specific example embodiments for various applications without departing from the inventive concepts. Such adaptations and modifications should be comprehended within the meaning and range of equivalents of the disclosed example embodiments. It is to be understood that the phraseology or terminology employed herein is for the purpose of description and not of limitation. Therefore, while the example embodiments herein have been described in terms of preferred embodiments, those skilled in the art will recognize that the example embodiments herein can be practiced with modification within the spirit and scope of example embodiments of the inventive concepts.

What is claimed is:

1. A method for managing an IP multimedia subsystem (IMS) call over Long-Term Evolution (LTE) in a Single Radio Voice Call Continuity (SRVCC) area, the method comprising:
   first detecting, by a User Equipment (UE), whether the IMS call over LTE is in an alert state and whether a Radio Resource Control (RRC) connection is configured for the IMS call over LTE;
   initiating, by the UE, a session alert refresh timer with a first value less than a second value of a data inactivity timer from a network entity;
   second detecting, by the UE, whether the session alert refresh timer has expired before establishing the IMS call over LTE;
   restarting, by the UE, the session alert refresh timer in response to a result of the second detecting indicating that the session alert refresh timer has expired before establishing the IMS call over LTE;
   sending, by the UE, a Session Initiation Protocol (SIP) message to the network entity; and
   determining, by the UE, whether a caller tune or media pre-configured prior to the IMS call being answered is configured between the first detecting and the initiating,
   wherein the initiating a session alert refresh timer is performed in response to the caller tune or the media being configured,
   stopping of the session alert refresh timer is performed in response to the caller tune or the media being not configured, and
   the method keeps the UE in an RRC connected state by performing the restarting and the sending.

2. The method of claim 1, further comprising:
   receiving, by the UE, the first value of the session alert refresh timer from the network entity before the initiating.

3. The method of claim 1, wherein the SIP message is a SIP UPDATE message with no media activity to keep the RRC connection active at the UE.

4. The method of claim 1, further comprising:
   receiving, by the UE, an RRC connection release message from the network entity;
   determining, by the UE, whether a strength of an LTE signal meets a strength threshold; and
   sending, by the UE, the SIP message to the network entity to keep the RRC connection active in response to the strength of the LTE signal meeting the strength threshold.

5. The method of claim 4, wherein the SIP message is a SIP UPDATE message with no media activity to keep the RRC connection active at the UE.

6. The method of claim 1, further comprising:
   sending, by the UE, a silent message to the network entity to keep the RRC connection active,
   wherein the silent message is sent over a Real-time Transport Protocol (RTP) to the network entity.

7. The method of claim 1, further comprising:
   indicating, by the UE, a status of the IMS call over LTE to a Non-access stratum (NAS) client included in the UE;
   receiving, by the UE, an RRC connection release message from the network entity;
   determining, by the UE, that the IMS call over LTE is in progress; and
   sending, by the UE, a service request message to a Access Stratum (AS) client included in the UE to update that the IMS call over LTE is in progress.

8. The method of claim 1, wherein
   the initiating includes initiating, by the UE, the session alert refresh timer with the first value less than the second value of the data inactivity timer from the network entity once the UE has moved to the alert state; and
   the sending sends, by the UE, the SIP message to the network entity to keep the RRC connected.

9. The method of claim 8, further comprising:
   restarting, by the UE, the session alert refresh timer in response to the result of the second detecting indicating that the session alert refresh timer has expired before establishing the IMS call over LTE.

10. The method of claim 9, wherein the restarting is performed in response to a result of the first detecting indicates that the IMS call over the LTE is connected.

11. The method of claim 10, further comprising:
the second detecting is performed between the initiating and the first detecting so that the UE re-starts the timer to keep the RRC connection active until the IMS call over the LTE is connected.

12. The method of claim 1, wherein the sending includes sending the SIP message with reason session alert refreshing, the reason session alert refreshing indicating a reason for restarting the session alert refresh timer to the network entity.

13. A User Equipment (UE) for managing an IP multimedia subsystem (IMS) call over Long-Term Evolution (LTE) in a Single Radio Voice Call Continuity (SRVCC) area, the UE comprising:
an IMS client including at least one first processor, the at least one first processor configured to,
first detect whether the IMS call over LTE is in an alert state and whether a Radio Resource Control (RRC) connection is configured for the IMS call over LTE,
initiate a session alert refresh timer with a first value less than a second value of a data inactivity timer,
second detect whether the session alert refresh timer has expired before establishing the IMS call over LTE,
restart the session alert refresh timer in response to a detected result indicating that the session alert refresh timer has expired before establishing the IMS call over LTE,
send a Session Initiation Protocol (SIP) message to a network entity, and
determine, by the UE, whether a caller tune or media pre-configured prior to the IMS call being answered is configured between the first detecting operation of the at least one first processor and the initiating operation of the at least one first processor,
wherein the at least one first processor is configured to initiate the session alert refresh timer in response to the caller tune or the media being configured,
the at least one first processor is configured to stop the session alert refresh timer in response to the caller tune or the media being not configured, and
the at least one first processor is configured to keep the UE in an RRC connected state by being configured to restart the session alert refresh timer and send the SIP message to the network entity.

14. The UE of claim 13, wherein the first value of the session alert refresh timer is a value received from the network entity.

15. The UE of claim 13, wherein the SIP message is a SIP UPDATE message with no media activity to keep the RRC connection active.

16. The UE of claim 13, further comprising:
an Access Stratum (AS) client including at least one second processor, the at least one second processor configured to receive an RRC connection release message from the network entity,
wherein the at least one first processor included in the IMS client is further configured to,
alert state and the Radio Resource Control (RRC) connection is configured for the IMS call over LTE,
determine whether a strength of an LTE signal meets a strength threshold, and
send the SIP message to the network entity if the strength of the LTE signal meets the strength threshold.

17. The UE of claim 16, wherein the SIP message is a SIP UPDATE message with no media activity to keep the RRC connection active at the UE.

18. The UE of claim 13, wherein the at least one first processor included in the IMS client is further configured to send a silent message to the network entity to keep the RRC connection active.

19. The UE of claim 18, wherein the at least one first processor included in the IMS client is further configured to send the silent message over a Real-time Transport Protocol (RTP) to the network entity.

20. The UE of claim 13, further comprising:
an Access Stratum (AS) client including at least one second processor, the at least one second processor configured to receive an RRC connection release message from the network entity; and
a Non-Access Stratum (NAS) client including at least one third processor, the at least one third processor configured to,
determine whether the IMS call over LTE is in progress, and
send a service request message to the AS client to update that the IMS call over LTE is in progress,
wherein the at least one first processor included in the IMS client is further configured to indicate a status of the IMS call over LTE to the NAS client.

* * * * *